PUNCHING AND READING APPARATUS FOR CALCULATING MACHINES

Filed Aug. 8, 1957 4 Sheets-Sheet 1

INVENTOR.
Carlos Wittenmyer.
BY
Word, Herron & Evans.
ATTORNEYS.

PUNCHING AND READING APPARATUS FOR CALCULATING MACHINES

Filed Aug. 8, 1957 4 Sheets-Sheet 2

INVENTOR.
Carlos Wittenmyer.
BY
Wood, Herron & Evans
ATTORNEYS.

Aug. 15, 1961 C. WITTENMYER 2,996,245

PUNCHING AND READING APPARATUS FOR CALCULATING MACHINES

Filed Aug. 8, 1957 4 Sheets-Sheet 3

INVENTOR.

Carlos Wittenmyer

BY

Wood, Herron & Evans,

ATTORNEYS.

INVENTOR.
Carlos Wittenmyer.
BY
Wood, Herron & Evans.
ATTORNEYS.

United States Patent Office 2,996,245
Patented Aug. 15, 1961

2,996,245

PUNCHING AND READING APPARATUS FOR CALCULATING MACHINES

Carlos Wittenmyer, 318 S. Broadway, Lebanon, Ohio

Filed Aug. 8, 1957, Ser. No. 677,071
10 Claims. (Cl. 235—61.6)

This invention relates to apparatus for recording numerical quantities by punching a coded pattern of holes in a record sheet and subsequently reproducing from the hole pattern the sum or quantity which is represented by the pattern. The invention embraces the concept of a simple apparatus which may be interconnected with a conventional calculating machine as an attachment, wherein the apparatus, in conjunction with the calculator, is capable of carrying out mathematical processes in an automatic fashion.

One of the primary objectives of the invention has been to provide punching apparatus of this character, wherein a sum or quantity is entered into a calculator by depressing the keys manually in the conventional way, the punching apparatus thereupon perforating in the record sheet a hole pattern representing the amount entered; the apparatus also prints or types the amount on an adjacent portion of the record sheet as an incident to the normal operation of the calculator.

Another objective has been to provide a reading apparatus, also interconnected with the calculating machine, arranged to interpret and feed into the calculator the amount recorded by the hole pattern, whereby the pattern-recorded sum may be combined with other sums fed manually into the machine to produce automatically a total or result reading of the combined sums. This result may then be perforated and printed on the sheet for subsequent automatic computations.

A further objective has been to provide a simplified hole pattern or code, wherein the location of a limited number of holes in various combinations within a relatively small pattern area reproduces or interprets consecutive numbers from zero to nine, thus saving a great deal of space on the record sheet and simplifying the mechanism of the punching and reading apparatus.

The broad concept of utilizing a punching apparatus and reading apparatus in the operation of a tabulating machine, typewriter or the like is well known in the art. In general, the known apparatus, as applied to a calculator, utilizes one hole for each numeral to be recorded and read, such that a total of ten holes may be required to record the digits from zero to nine. As a consequence, the punching and reading apparatus necessarily is complex, and the hole pattern requires a great deal of space on the record sheet.

According to the present example of the invention, the punching and reading apparatus utilizes for each digit only four holes in a pattern, the holes being capable of recording numerals from one to nine by the use of a code system in the positioning of the holes. Accordingly, by combining the holes in various groups, the holes of each pattern represent the digits from one to nine. The zero is obtained by leaving in blank the area for that particular space in the line of digit patterns. A line of digits representing a given sum is recorded in a corresponding line of patterns, one for each digit, each pattern having one or two holes therein.

The punching and reading apparatus of the invention takes advantage of the accumulating action of the calculator to obtain the advantages of simplicity in the punching and reading apparatus and the saving of space in the coded hole pattern. In other words, the code pattern of four holes in a given pattern area enters the recorded digit into the calculator by actuating one or more keys to obtain the required digit, thus actuating only four keys in obtaining the digits from one to nine as distinguished from using nine keys according to conventional practice.

Described briefly, the conventional calculator includes columns of keys being provided for each digit in a line of figures which is to be entered into the machine. Under conventional practice, the operator manually depresses a key in each row to enter the amount to be added or subtracted. For example, if the sum or number 138.00 is to be entered, the operator depresses the "1" key in the first column, the "3" key in the second column, and the "8" key in the third column from left to right. If the keyboard is provided with zero keys, two zeros are added, otherwise the machine enters the zeros automatically.

In the example disclosed herein, which illustrates the principles of the invention, the "1," "2," "4" and "7" keys of a conventional calculator are equipped with an actuating device for depressing them electrically, the remaining keys being undisturbed. The four electrical keys, according to the present principles, are utilized to enter all digits from zero to nine. The electrically operated keys are energized in response to the reading apparatus which is electrically connected to the designated electrical keys and which sends signals in response to the coded punch pattern which is inserted into the reader. The reader includes four contacts connected to the electrical keys which are energized either individually or in sequence. By way of example, if the numbers 1, 2, 4 or 7 are coded on the card or sheet, then that number is entered by direct electrical actuation of one of the designated keys. However, if numbers other than those of the designated keys are to be entered (3, 5, 6, 8 and 9) then the digit is entered by the two-time sequential operation of the electrical keys. Thus, if the number 3 is to be entered, then the "1" and "2" electrical keys are depressed in sequence, the accumulator adding together the 1 and 2 to enter the total of 3. The remaining digits (5, 6, 8 and 9) are obtained by other keys sequentially depressed, as explained in detail in the specification.

A further objective has been to provide a simple electrical actuating device for the designated keys which occupy very little space and which do not interfere with the manual operation of the keys. By virtue of the present actuating devices, a conventional calculator may be modified in a simple manner to provide the automatic reading operation.

The key actuating devices are in the form of electrical motors or solenoids, each connected to a respective electrical key and arranged, upon being energized, to depress and release the key rapidly, the action being similar to that which is imparted to the keys during manual operation. The rapid action, which is so provided, enters each quantity in a fraction of a second, then reconditions the machine to receive the next quantity in the same row of keys as in manual operation. The actuating devices do not in any way interfere with manual operation of the keys.

The principles of the invention are disclosed in relation to the printing attachment disclosed in the prior patent of Carlos Wittenmyer No. 2,637,493, which was issued on May 5, 1953. The patent discloses a printing attachment which is operatively connected to the result wheels of a calculating machine so as to print the result of a calculation on a record sheet. According to the present disclosure, the printing attachment is modified without changing the principles shown in the patent to print the amount entered, and also to punch the corresponding hole pattern in another portion of a sheet. The invention is capable of a wide variety of uses and is disclosed herein in relation to keeping on a balance sheet a running account of banking transactions.

The following description is made in relation to a deposit, bearing in mind that the last balance is perforated in the sheet as a record. When the deposit is made, the clerk enters the amount by depressing the keys of the calculator in the usual way and inserts the sheet into the printing attachment, which prints the amount of deposit. After the deposit is printed, the clerk shifts the sheet to a second position, wherein the hole pattern, which represents the previous balance, is scanned by the reader. During the reading cycle, the amount of the balance is interpreted and the reader transmits electrical impulses to depress the electrical keys, thus entering the balance into the accumulator. The sheet is now shifted to a printing position and the new balance is printed on the statement, and a hole pattern, corresponding to the new balance, is perforated by the punching apparatus, thus completing the transaction.

Another aspect of the invention resides in the structure by which the hole pattern is punched in the record sheet. Essentially, the punching apparatus comprises respective shiftable punching sectors, one for each punch pattern which represents a digit, the sector being generally similar to the printing sectors shown in the patent; however, instead of a raised type face, the working face comprises patterns of slots which are coded to reproduce the code hole patterns. The actual hole punching is accomplished by a group of punches, the upper ends of the punches residing in contact with the slot pattern of the working face, the arrangement being such that those punches which reside in registry with the slots are inactive. Accordingly, when the record sheet is pressed against the punches by a perforated die plate, only the active punches, in response to the slot pattern, provide the pattern of perforations.

The reader for each digit comprises a group of reader plungers arranged in a pattern identical to the punches and loosely carried in a reader cage. A pattern of contacts, which is in electrical connection with the electrical keys, resides below the ends of the plungers and in registry with them. When the perforated sheet is placed between the reader plungers and contacts, the reader cages, with its plungers, is lowered toward the contacts, such that the ends of certain plungers pass through the punched openings, while other plungers of the group contact the sheet, which acts as an electrical insulator. Upon engaging the contacts, the plungers complete electrical circuits in sequence which energizes the selected electrical keys of the row.

A significant feature of the reader resides in the arrangement of the plungers, whereby the cage is magnetized and maintains the plungers with their sheet-contacting ends disposed in a staggered or inclined plane but which allows them to slide relative to the cage as they are shifted into engagement with the contacts. According to this concept, the upper ends of the plungers contact a flat level surface when in the normal elevated position, such that the longest plunger first makes contact as the cage is lowered. Thereafter, the first plunger remains in stationary position while the cage and the remaining plungers continue to descend, thus providing sequential signals which are sent to the four electrically operated keys to take advantage of the accumulating action of the calculator. After being fully lowered at the end of the reading cycle, the cage is again elevated to bring the upper ends of the plungers into contact with the flat surface overhanging them, thereby to reset the lower ends of the plungers to the angular plane for the next sequential signalling cycle.

Various other features and advantages of the invention will be more fully apparent to those skilled in the art from the following detailed description taken in conjunction with the drawings.

*Structure and operation generally*

In order to illustrate the principles of this invention, the drawings illustrate the card punching and reading apparatus incorporated in the printing attachment of a calculating machine according to the aforesaid Wittenmyer Patent No. 2,637,493, the printing attachment being modified, as explained later, to accommodate the apparatus. In the present disclosure, the punching and reading apparatus is shown in simplified form in order to present the operating principles in a clear and understanding manner, the reading and punching operations being controlled manually, at least in part. It will be understood that it is also contemplated to utilize an automatic control system to provide rapid, sequential operation of the punching and reading cycles as well as automatic printing, as disclosed in the patent. It will also be understood at this point, that the printing apparatus and reading apparatus may comprise separate machines or attachments for operation in conjunction with respective calculating machines of conventional design, instead of being incorporated in a single attachment as disclosed herein.

Figure 1:
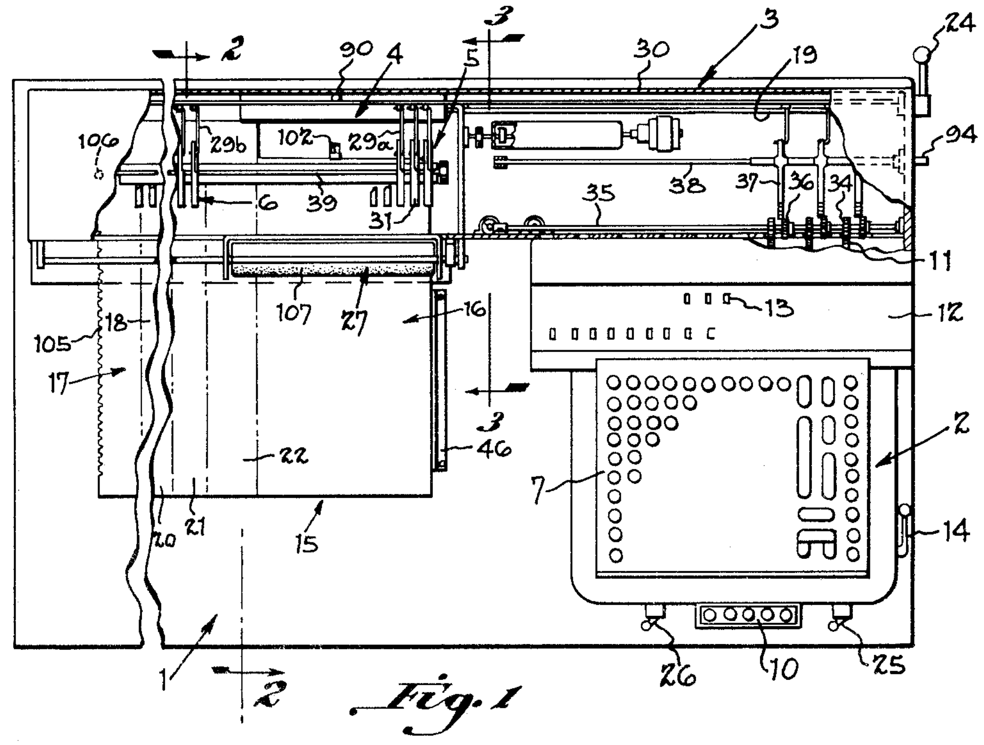
FIGURE 1 is a top plan view of a calculating machine equipped with a printing attachment according to the patent which includes the punching and reading apparatus of this invention.
Figure 2:
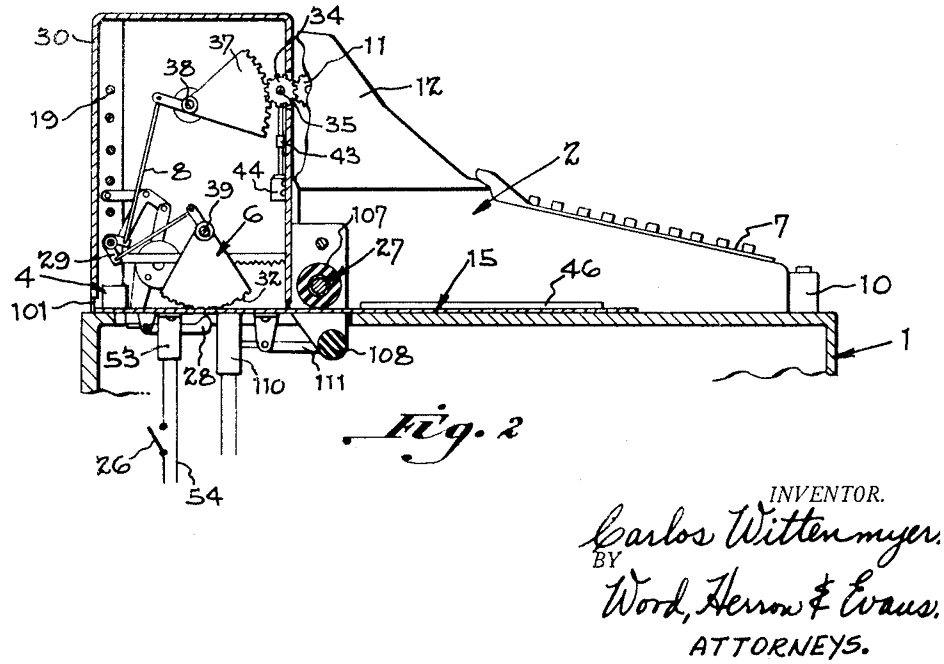
FIGURE 2 is a sectional view taken along line 2—2 of FIGURE 1, illustrating in a general way the mechanical interconnection of the present apparatus with the result wheels of the calculator.

Described generally with reference to FIGURES 1 and 2, a typewriter desk or table, indicated generally at 1 supports a calculating machine 2 which is operatively connected to a printing attachment 3 of the type disclosed in the above patent. In the present disclosure, a reading apparatus, indicated diagrammatically at 4 in FIGURE 1, is located in the rearward portion of the printing attachment.

The punching apparatus, indicated generally at 5, is also incorporated in the printing attachment. To accommodate the added mechanism, the housing of the printing attachment 3 has been extended lengthwise, such that the printing sectors, indicated generally at 6, reside adjacent the punching apparatus 5. As explained later in greater detail, the operating components of the printing attachment 3 are also utilized in part to actuate the punching and reading equipment.

The calculating machine 2 is provided with a keyboard 7 which comprises the usual column of keys for entering digits in the order of zero to nine. With the exception of the result wheels which, as explained later, operate the printing and punching mechanism, the details of the calculating machine have been omitted since they are not relevant to the invention.

The invention is described herein as applied to an accounting system used in banking transactions, particularly the balancing of a checking account; hence, the disclosure is made in relation to adding and subtracting amounts from a bank balance. As described in the patent, the decimal places of the figures printed on the balance sheet are selected manually by decimal switches 10 which are located along the forward edge of the calculating machine. These switches are interconnected with the printing attachment and shift the carriage rollers laterally. According to the present disclosure, the decimal selector mechanism has been modified to shift the balance sheet to positions aligning its deposit or withdrawal columns with the printing sectors. No decimal selection is required when the machine is used for straight addition or subtraction in banking operations.

It will be understood at this point, that the calculating machine includes an accumulator mechanism, which, when set for adding, stores the amount entered into the machine upon depressing the keys, adding each sum sequentially entered to provide the sum total. This sum appears on a series of numeral wheels from zero to nine. These wheels are driven by result gears 11 and are located in a row within the carriage 12 of the calculator; the numerals are visible through windows 13 formed in the carriage. In conventional operation, the sum total is observed and recorded, then the machine is cleared by operating a cancelling lever 14 which rotates the result wheels back to their zero position.

The standard calculator is equipped with keys or bars for adding or subtracting. It also includes a sub-total key (not shown) which is depressed to store a sub-total (the sum of several amounts entered) which is later added to or subtracted from amounts later entered to create a total amount. To bring about the punching and reading operations, the printing apparatus of the patent is modified slightly to punch and print when the cancelling lever 14 is operated and also when the sub-total key is actuated, as described later.

According to the patent, the rotary motion of the result wheels from an indicating position (whether total or sub-total) back to zero is utilized to shift the printing sectors 6 of the attachment 3 to positions in which they print upon a record sheet a line of figures corresponding to the sum total previously displayed by the result wheels. In the present structure, the same apparatus conditions the punching mechanism to punch the coded hole pattern in the record sheet alongside the printed figures. This hole pattern subsequently is utilized to reproduce a corresponding number when the sheet is inserted into the reading apparatus 4. This operation causes the previous balance or total, which is decoded by the reader from the punched holes, to be entered into the accumulator and added to or subtracted from another amount which is entered manually by depressing the keys.

To bring about the reading operation, the keys of the calculating machine are provided with electrical operating devices which depress selected keys in the columns in response to electrical signals from the reading device. Thus, according to the present example, the same calculating machine is operated both manually (in entering sums to be added or subtracted), and electrically in response to the reader to calculate the sum of or the difference between the two amounts.

Figures 10, 11, 12, 13, 14:
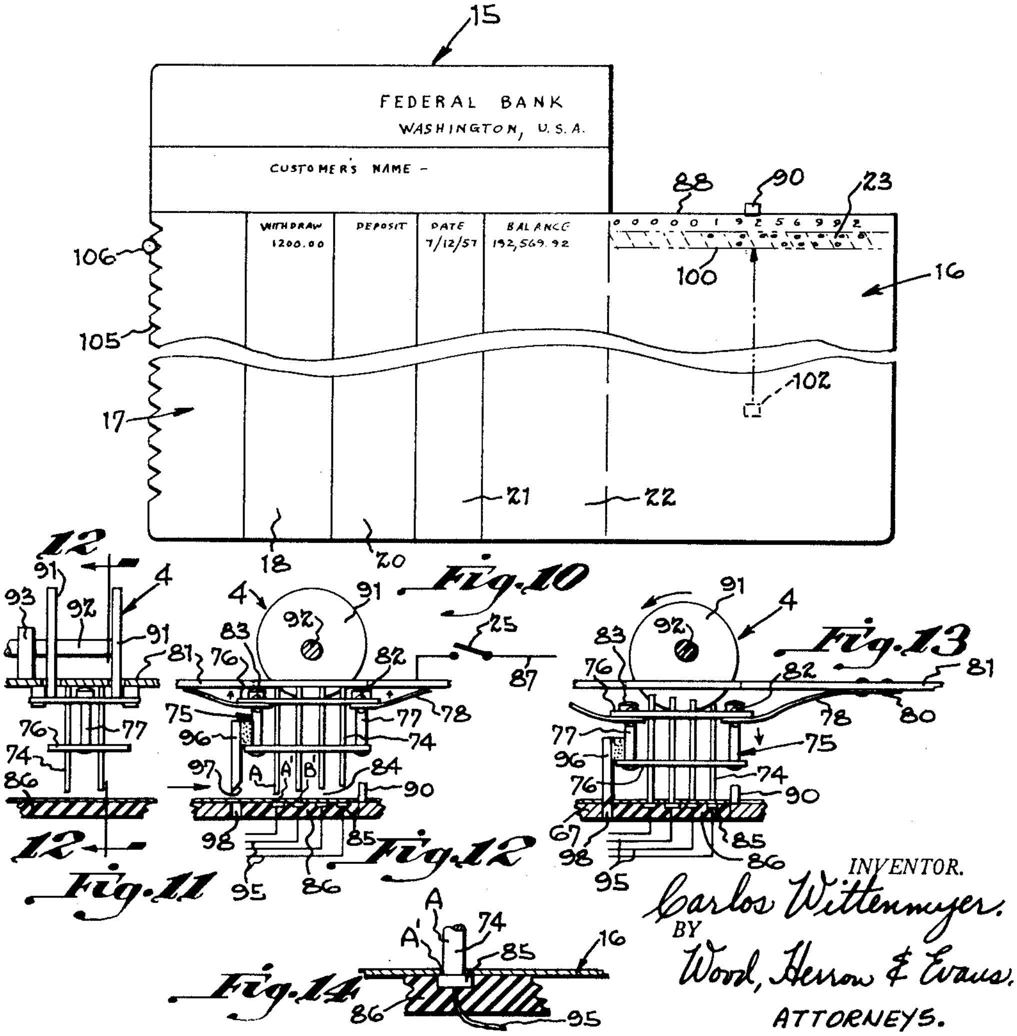
FIGURE 10 shows a typical bank statement sheet which may be utilized with the present punching and reading apparatus.
FIGURE 11 is a view taken along line 11—11 of FIGURE 3, detailing one of the reading devices of the invention.
FIGURE 12 is a sectional view taken along line 12—12 of FIGURE 11, showing the reading device in developed form in its normal inactive position.
FIGURE 13 is similar to FIGURE 12, showing the position of the parts during a reading cycle.
FIGURE 14 is an enlarged fragmentary view detailing one of the contactors of the reading device in operating position during the reading cycle.

Referring to FIGURE 10, there is disclosed a bank statement indicated generally at 15 which is utilized with the present apparatus in keeping a running account of the balance as sums are deposited or withdrawn from the account. The balance sheet preferably is fabricated from cardboard and includes a punching section 16 along its right hand side and a printing section 17 along its left hand side. The printing section is subdivided to provide a column 18 for amounts withdrawn, a column 20 for amounts deposited, a date column 21, and a balance column 22. Each time an amount is deposited or withdrawn from the account, the remaining balance is punched in the card as indicated at 23 and the corresponding balance is also printed in the balance column alongside the hole pattern, as shown.

In the example illustrated in FIGURE 10, the customer has withdrawn the sum of $1200.00 leaving a balance of $192,569.92, the $1200.00 having been subtracted from the previous balance ($193,769.92—not shown). It will be noted that the punching section 23 is perforated to record the same amount which is printed in the balance column.

According to the present example, the entry of a new deposit (or withdrawal) and the entry of a new balance is done in separate operations. In the first operation, assuming that a deposit is made, the clerk inserts the balance sheet 15 in the apparatus and depresses one of the selector keys 10, thereby to shift the carriage (and balance sheet 15) laterally to align the deposit columns with the printing sectors. Next, he depresses the add bar, then enters into the calculator the amount of the deposit. Finally, he actuates the sub-total key; this causes the amount of the deposit to be printed in the deposit column 20 by operation of the printing attachment through its automatic cycle. At the end of the cycle, the tub-total (amount deposited) remains stored in the calculator.

In a second or reading operation, the balance sheet is shifted to a second position to be scanned by the reading apparatus 4 which actuates the calculator electrically to enter the amount of the previous coded balance ($192,569.92) into the accumulator; no printing is done at this time. Since the sub-total remains in the machine from the first operation, the amount of the deposit (sub-total) is added automatically to the previous balance during the reading operation. The new balance (sum total of the deposit and previous balance) thereafter is printed and punched on the record sheet 15, one line below the previous balance in a third operation, as described below. In the present example, there is provided a reader lever 24 (FIGURE 1) which is shifted manually to actuate the reading apparatus 4 in the second operation. To energize the reading apparatus, an electrical switch 25, located along the front of the calculator, is closed manually before the lever 24 is actuated.

In the third or punching operation, a punching switch 26 is shifted manually to provide the balance punching operation. The clerk now shifts the record sheet from its scanning position relative to the reader back to its first position and actuates the cancelling lever 14 to cause the new balance to be printed and punched on the balance sheet. During the punching cycle, When the sheet is properly positioned, the control apparatus energizes a plurality of electrically operated type hammers 28, one set of hammers impressing the printed type and a second set actuating the punch mechanism as described later.

As stated earlier, the carriage rollers 27 shift the record sheet laterally to locate the several columns in the printing position. This is brought about by depressing the proper selector switch 10 before each amount is printed (deposit, withdrawal and balance).

*Punch selector mechanism*

The punching apparatus 5 and printing apparatus 6 are located within the housing 30 of the printing attachment in side-by-side relationship in positions to act upon the punching section 16 and printing section 17 of the bank statement 15. The punching apparatus includes a series of punch sectors 31 which are similar to the printing sectors 6, there being provided corresponding pairs of printing and punching sectors 6 and 31. Each related pair of punching and printing sectors is driven in common from a respective result gear 11, previously noted. The sectors of each pair (printing and punching) are identical in profile; however, each printing sector includes raised type numerals along its arcuate working face 32, running from zero to nine, while each punch sector includes a pattern of selector slots 33 along its working face. These slots create the coded hole patterns which correspond to the numeral (0–9) displayed by the result wheel and printed by the mating type sector, as explained later. The actuating mechanism of the sectors is similar to that shown in the patent and for this reason, the following description is limited to those parts which are necessary to comprehend the punch selecting mechanism.

The printing and punching segments are shifted to their punching and printing positions during the reset rotation of the result gears 11, that is, during rotation of the gears from a numeral-indicating position back to the zero position. For this purpose, the driving system of the segments, which is mounted within housing 30, is uncoupled from the result gears 11 as they rotate forwardly from zero to a numeral-indicating position. After the result gears have rotated to positions indicating a result, they are coupled to the driving system of the segments of the printing and punching apparatus. As noted above, there is provided a corresponding printing and punching segment for each result gear, such that a digit is printed and punched corresponding to the digit previously exposed by each result wheel.

When the sub-total key is actuated after a deposit is entered (first operation), the result gears 11 rotate back to zero, thus shifting the punching and printing sectors to positions for recording that amount; thereafter, they rotate forwardly. Accordingly, when the last balance is picked up from the hole pattern (second operation) the gears rotate forwardly from the deposit position to indicate the sum of the last balance and new deposit. Upon actuation of the cancelling lever 14, all of the gears rotate back to zero thus setting the sectors to positions recording the total or new balance. The same action takes place in reverse order during a withdrawal (subtracting) operation.

Figures 3, 4:
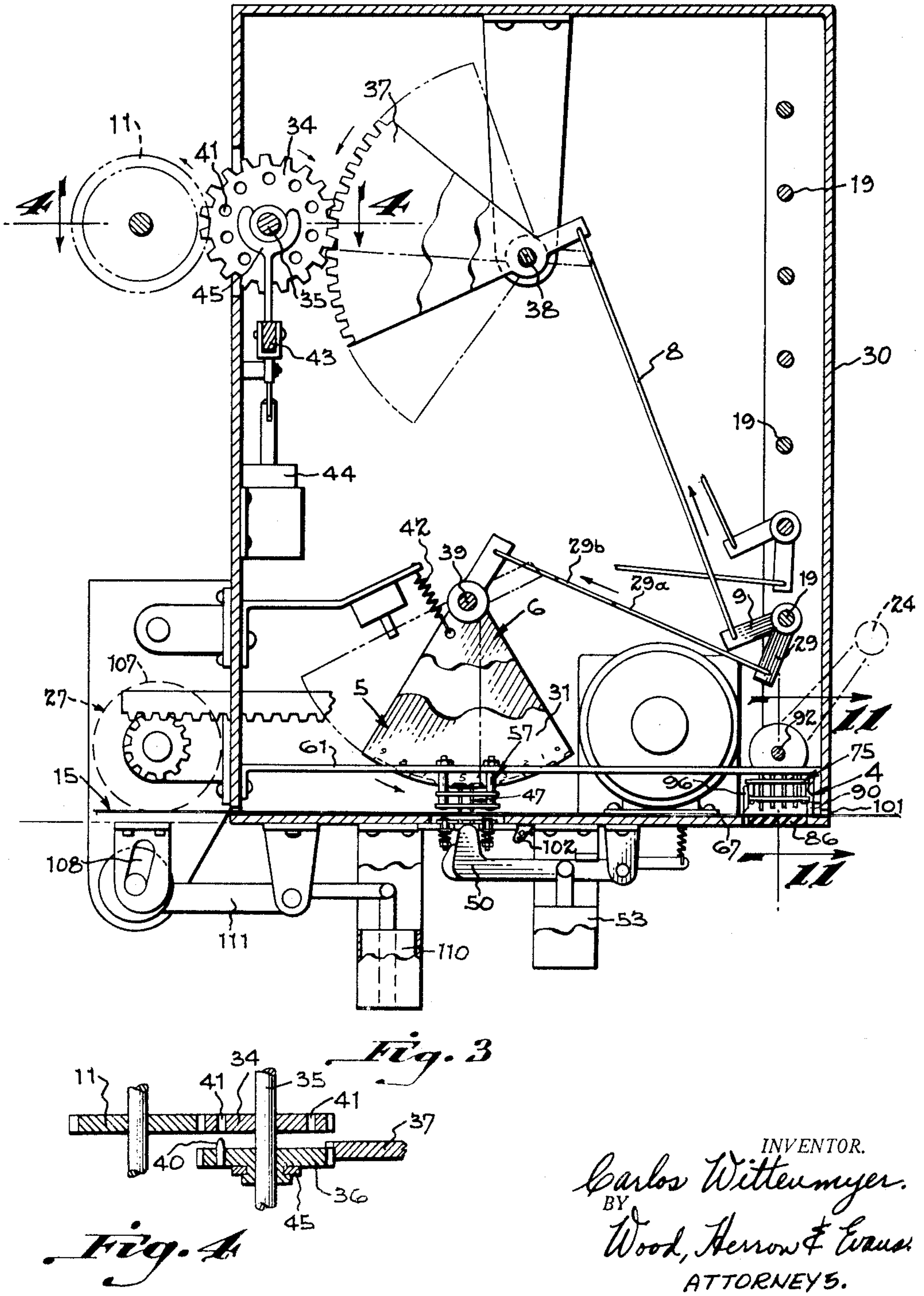
FIGURE 3 is an enlarged sectional view taken along line 3—3 of FIGURE 1, illustrating in greater detail the driving system from the result gears to the punching segments.
FIGURE 4 is a sectional view taken along line 4—4 of FIGURE 3, detailing one of the coupling gears which drives the punching and reading apparatus.

As best shown in FIGURES 3 and 4, each result gear 11 is coupled to the sector actuating mechanism by a respective idler gear 34 loosely journalled upon a shaft 35 within housing 30. Adjacent each idler gear 34 there is slidably mounted on shaft 35, a coupling gear 36 in constant mesh with a sector gear 37 journalled on a shaft 38. Each coupling gear 36 normally resides in disengaged position (FIGURE 4), allowing the result gear 11 and its related result wheel to be rotated to its indicating position during a calculating cycle. The related printing and punching sectors normally reside in the zero position indicated in broken lines in FIGURE 3 during the calculating cycle, with the coupling gears disengaged.

As shown in FIGURE 4, each coupling gear 36 includes a tapered pin 40 arranged to enter one of a series of ten holes 41 formed in the idler gear. The holes 41 correspond to the numerals zero to nine of the result wheels. At the end of a calculating cycle, the idler gear will have been rotated to a position in which one of its holes 41, corresponding to the digit displayed, is aligned with the tapered pin 40. When the coupling gear is shifted to its engaged position, pin 40 enters the aligned hole; therefore, as the result wheels and gears 11 rotate back to zero, as indicated by the arrows in FIGURE 3, the printing and related punching sector of each result gear are advanced to print and punch the digit previously displayed by the result wheel. The parts are shown in full lines in FIGURE 3 in the printing and punching position. After the printing and punching operation, the coupling gears 36 are disengaged and the sectors are shifted back to their zero positions by tension springs 42 which are connected to the respective sectors. This position is shown in broken lines in FIGURE 3.

As indicated in FIGURE 3, the gear sectors 37 individually are linked to a corresponding printing and punching sector. Each linkage system comprises a primary link or rod 8 having its upper end pivotally connected to its gear segment 37 and its lower end connected to a driving lever 9 fixed upon a rock shaft 19 which is journalled within housing 30. Each rock shaft 19 extends laterally for the full length of housing to its printing and punching sector.

For actuating its printing and punching sectors, each rock shaft includes a second lever 29 of the same length as driving lever 9 but angularly related to it. The swinging end of each second lever 29 is connected by a pair of links, *29a*, *29b*, one extending to the printing sector and the other extending to the related punching sector. Thus, both sectors are shifted in unison by the gear sector 37. It will be noted at this point, that the companion punching sectors and printing sectors are loosely mounted upon a common shaft 39 and that the printing face and punching face of the sectors reside in corresponding positions whether active or inactive.

The coupler gears 36 are shifted to engaged or disengaged positions by respective solenoids which are operatively connected to a shift bar 43, one of the solenoids being indicated at 44 in FIGURE 3. Shift bar 43 includes a plurality of yokes 45, one for each coupling gear. The bar and yoke shifts all of the coupling gears to the disengaged position (FIGURE 4) as the result gears advance; before the gears rotate back to zero, one of the solenoids is energized to shift the bar and coupling gears to the engaged position. Therefore, as the result gears rotate back to zero during the sub-total or total recording, the sectors are shifted to positions to record the digit previously displayed in each case. It will be noted that no movement is imparted from those result gears which remain at zero during these operations; hence, the sectors which are in driving connection with those particular gears remain at zero when the machine is cleared.

To align the printing sectors with the respective columns, the apparatus is provided with a lateral guide 46 as shown in FIGURE 1. The clerk places the sheet against the guide when sheet is inserted, as explained later.

The printing sectors of the balance column remain inactive when the withdrawal or deposit amount is entered; these sectors being in driving connection with the accumulator of the calculating machine. Although the balance sectors may shift in accordance with the amounts deposited or withdrawn, the printing hammers of the deposit section remain inactive when the withdrawal or deposit amount is printed. For this purpose, the type hammers of the balance or total sectors are interconnected with the punching switch 26, the arrangement being such that the type hammers of the balance printing and punching sectors are actuated only during the punching cycle.

*Hole punching mechanism*

The punching mechanism, which perforates the code strip 23 in the punching section 16, is best illustrated in FIGURES 5–9. Each punch sector 31, as shown in these views, controls the punching action of a group of four punches indicated at 47. As noted earlier, the four punches of each group perforate a code pattern of holes in the sheet which represent the numerals 0 to 9 in accordance with the position of each punch sector 31. There is provided one sector and one group of punches for each digit to be recorded as a line of patterns in the punching section 16.

The four punches 47 of each punch sector 31 are activated in various combinations to provide ten different code patterns (0–9), the selector slots 33 deactivating certain punches and the backing spaces 48 between the slots causing actuation of the selected punches. The actual punching is executed by punch hammers 50 (similar to the type hammers 28) which shift a perforated die plate 51 upwardly toward the cutting ends of the punches. The perforated die plate carries the record sheet 15 to the cutting ends of the punches (FIGURE 9), the cutting ends 52 being angular to provide a shearing action.

The punch hammers 50, similar to the type hammers shown in the patent, are operated by punch solenoids 53 (FIGURE 3). In the case of the type hammers 28, a typewriter ribbon or the like is interposed between the working face 32 of the printing sectors according to conventional practice. The type hammers 28 of the balance sectors and the punch hammers 50 are energized only when the punch switch 26 is closed for the balancing operation. As shown diagrammatically in FIGURE 2, the punching switch 26 is interposed in one of the lines 54 leading to the punch solenoids 53 from the control system of the printing attachment. The lines which energize the type hammers for the withdrawal and deposit sectors (not shown) are energized by the control system, during an operating cycle each time an amount is entered into the calculator, as disclosed in the patent.

Figures 5, 6, 7, 8, 9:
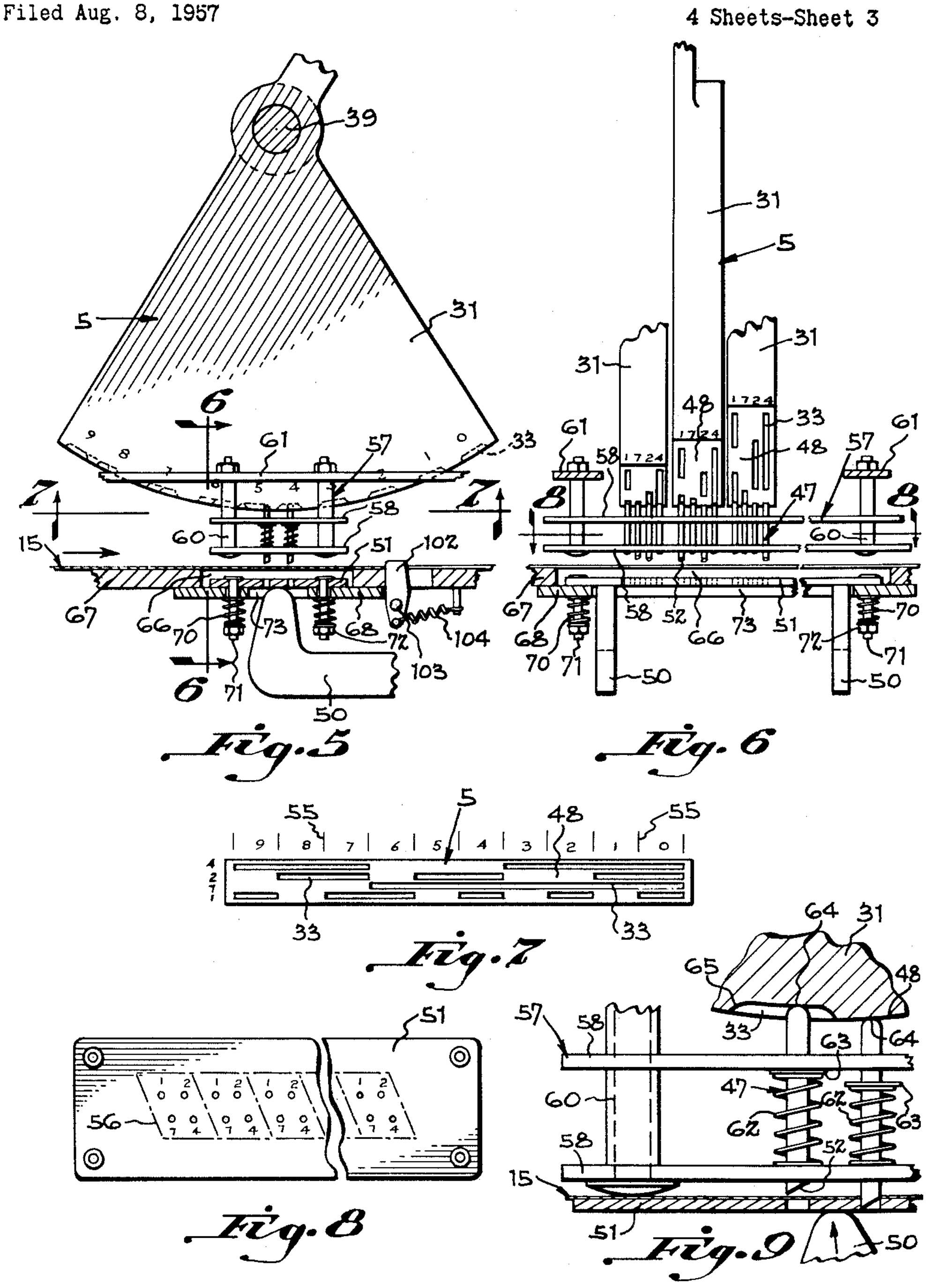
FIGURE 5 is an enlarged view detailing one of the punch sectors and punching mechanism.
FIGURE 6 is an end view projected from FIGURE 5, further detailing the punching mechanism.
FIGURE 7 is a developed view of the face of one of the punch sectors, as taken along line 7—7 of FIGURE 5, illustrating the system of coded slots which selectively activate the punches.
FIGURE 8 is a sectional view taken along line 8—8 of FIGURE 6, illustrating diagrammatically the punch pattern of several sectors.
FIGURE 9 is an enlarged fragmentary view showing a portion of the punching mechanism in active or perforating position.

Referring to FIGURE 7, which represents a development of the working face of one of the punch sectors, the positions of the sector for printing the numerals from 0 to 9 are indicated by the division lines 55. As shown in FIGURE 6, the four punches 47 of each group are located in alignment with the selector slots 33. Each group of four punches locates one or two holes in various positions within the parallelograms 56 indicated by the broken lines in FIGURE 8, the several parallelograms representing a line of numbers.

As noted earlier, each column of keys for electrically punching and printing the balance consists of ten keys representing 0 to 9. However, according to the invention, only the "1," "2," "4" and "7" keys need be electrically operated to punch and print numerals from 0 to 9. The digits 1, 2, 4 and 7 are entered into the accumulator by selective energization of these keys upon signals from the reader. However, the remaining numerals (3, 5, 6, 8 and 9) are entered by additive or sequential depression of the same four keys in combination in response to repeated signal impulses from the reader. The code pattern of holes energizes the electrically responsive "1," "2," "4" and "7" keys in the following sequence to record the numerals 3, 5, 6, 8 and 9:

To obtain the numeral 3, the "1" and "2" keys of the bank are depressed electrically in sequence to store the numeral 3 in the accumulator. For the numeral 5, the "1" and "4" keys are depressed electrically in sequence. The numeral 6 is entered by depressing the "2" and "4" keys. The numeral 8 is entered by the "1" and "7" keys, and 9 is entered by the "7" and "2" keys. The zero is entered when so signal is sent from the reader; in this instance, the result wheels and sectors remain in their zero position for that bank of keys.

The punches are spring loaded upwardly and the punches are maintained in active position when their upper ends are engaged upon the backing surface 48 between the slots; they shift to a retracted position when one of the slots is in registry with the upper end of the punch. Thus, as shown in FIGURE 6, only those punches which are in engagement with the backing surface 48 pierce the sheet 15 when the die plate 51 is elevated by the punch hammer 50. Referring to FIGURE 7, it will be noted that all of the slots 33 are aligned with the punches in the zero position of the sector; hence, the punches are retracted and no hole is punched in the area 56 when the die plate is elevated. In the 1 position of the sector, the slots are aligned with the "2," "4" and "7" punches and the backing space 48 causes the operation of the "1" punch only. The backing spaces and slots also activate the "2," "4" and "7" punches individually as indicated in the diagram. It will be seen that the numeral 3 is coded by the "1" and "2" punches; 5 by the "1" and "4" punches; 6 by the "4" and "2" punches; 8 by the "1" and "7" punches; and 9 by the "2" and "7" punches. The code pattern thus is related to the four electrically operated keys of the calculator as noted above. The reader is provided with a corresponding pattern of four contact plungers, as explained later, the plungers passing in sequence through the holes to provide the additive key action.

Described in detail, the groups of punches 47 is carried in respective punch cages 57, each consisting of spaced plates 58—58. The plates are mounted in spaced relation upon spacers 60, the upper ends of the spacers being supported by respective cross rails 61 which have their opposite ends secured to the housing 30. Each individual punch 47 passes slidably through the plates 58 and each is biased upwardly by a spring 62 in compression against a snap ring 63 anchored to the upper portion of the punch. The lower end of each spring is seated against the lower plate 58 of the punch cage.

The upper ends of the punches are rounded as at 64, which provides a camming action with respect to the curved ends 65—65 of the slots 33. For simplicity, the springs have been omitted in FIGURE 6; however, it will be noted in this view that the cutting ends 52 of the active punches reside immediately above the plane of the sheet 15 in the lower portion of the die plate 51. At the upper stroke of the die plate (FIGURE 9), upon actuation of the punch hammers 50, the sheet is forced upon the ends of the active punches while the sheet remains blank at the inactive punches.

The die plate is mounted within an opening 66 formed in the bottom panel 67 of housing 30. It is supported by a mounting plate 68 attached to panel 67, the die plate being confined in its downward position by a pair of compression springs 70 confined on studs 71. The upper ends of the studs are anchored to the die plate and they pass through clearance openings formed in mounting plate 68, such that the springs 70 are in compression between mounting plate 68 and the nuts 72 threaded upon the lower ends of the studs. Mounting plate 68 includes a central opening 73 providing clearance for the operating ends of the punch hammers 50.

The solenoids 53 which actuate the punch hammers 50 provide sufficient energy to shift the die plate 51 to its perforating position counter to the compression springs 70. As soon as the punching operation is completed, the solenoids are deenergized and the die plate is shifted back to its inactive position by the compression springs 70, allowing the perforated sheet to be withdrawn.

*Reading apparatus*

Figures 15, 16, 17:
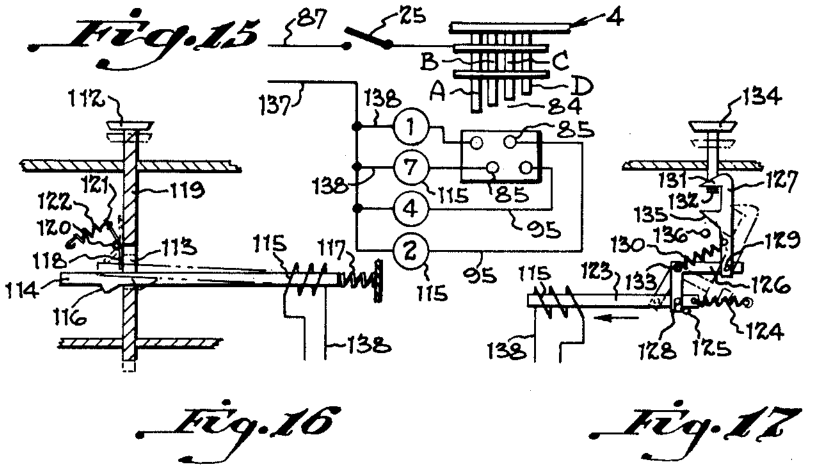
FIGURE 15 is a diagrammatic view showing the electrical circuit of the reading and key actuating apparatus.
FIGURE 16 is a diagrammatic sectional view illustrating one of the electrically operated key actuating devices.
FIGURE 17 is a diagrammatic view illustrating a modified key actuating device.

A reading apparatus for carrying out the principles of the invention is disclosed in FIGURES 11–14. This structure is mounted in the rearward portion of housing 30 as previously indicated at 4 in FIGURE 1. Two types of electrical key actuating devices for entering the balance carried on the punched card, are illustrated in FIGURES 16 and 17. The key actuating devices are energized in response to the signals sent by the reading apparatus, as explained later.

The reading apparatus 4 comprises individual electrical readers, one for each digit to be stored in the punching section 16. Each reader comprises a set of four plungers 74 slidably carried in a cage 75. The plungers actuate the "1," "2," "4" and "7" keys and are located in positions which match the hole patterns delineated by the parallellogram areas 56 previously described with reference to FIGURE 8. The cage 75 of each reader comprises a pair of plates 76—76 mounted in spaced relationship to one another by a pair of spacers 77. The spaced plates 76, as well as the plungers 74, are fabricated from steel or similar magnetic metal. The plates 76 are permanently magnetized and form the two poles of a magnet. The steel plungers 74 are loosely fitted within matching bores in the two plates and thus act as the armatures of the permanent magnet, being held in position by the magnetic flux of the plates. The magnetic action provides the sequential closing action of the plungers 74, as explained below. The plungers of the readers engage respective stationary contacts in accordance with the hole pattern, as explained below.

As shown in FIGURES 11 and 12, each reader cage is supported by leaf springs 78 which have their outer ends attached as at 80 to a cross bar 81 having its ends mounted within housing 30, as explained with reference to the cross bars 61 of the punch mechanism. The free ends of the leaf springs are connected as at 82 to the opposite ends of the upper plate 76. In the elevated position of the cage (FIGURE 12), the upper ends of the plungers contact the lower surface of cross bar 81. The heads 83 of the spacers 77 also contact the cross bar and space the upper plate properly from the bar.

It will be noted in FIGURE 12, that the plungers have progressively increasing lengths, such that their lower ends reside in an inclined plane as indicated at 84. The plungers are slidably held in the position of FIGURE 12 by the magnetic flux of the cage. The inclined plane of the plunger ends creates the sequential signals which are sent to the electrical keys "1," "2," "4" and "7."

In the preferred arrangement, the plunger for the "1" key, as indicated at A in FIGURE 12 has the greatest length, the plungers B, C and D being progressively shorter. The plungers are arranged to energize in sequence the "1," "2," "4" and "7" keys, as explained later.

To simplify the disclosure, the four plungers and their stationary contacts 85 are shown in FIGURES 12 and 13 residing in a single plane, although it will be noted in FIGURE 11 that the plungers actually are arranged in pairs side-by-side, matching the hole patterns of the areas 56 (FIGURE 8). The stationary contacts 85, as shown diagrammatically in FIGURE 15, reside in registry with the pattern of plungers, such that the plungers sequentially engage the contacts as the reader cage is lowered to the contacts.

The stationary contacts are mounted in an insulating panel 86 which is set in the bottom panel 67 of housing 30 as best shown in FIGURE 3. An electrical circuit is completed from the plungers 74 to the stationary contacts by way of the line 87, which is energized through the control unit of the printing attachment. The reader switch 25 is interposed in the line 87, the switch being closed during the reading cycle. The reader circuit is shown in FIGURE 15 and operates in conjunction with the calculator as explained below.

When the balance is to be entered from the punched section 16, of statement 15, the sheet is inserted into the apparatus by the clerk until the upper edge 88 of the punch section 16 engages a fixed stop 90. The stop 90 and lateral guide 46, locates the coded strip 23, which carries the last balance, precisely in registry with the plungers 74 and their stationary contacts 85. The reader cage 75 resides in its normal elevated position at this point. The clerk now closes the reader switch 25, then actuates the reader lever 24 (FIGURE 1).

The reader cage is lowered by a pair of eccentrics 91—91 carried on a shaft 92 which is journalled as at 93 for rotary motion. Shaft 92 is rotated through approximately one-half turn by the reader lever 24 which is attached to its outer end, a stop 94 (FIGURE 1) being mounted upon the end wall of housing to limit the motion of the lever. As the reader lever is swung forwardly, the shaft and eccentrics are rotated in the direction indicated by the arrow (FIGURE 13). The eccentrics bear against the surface of the top plate 76 of cage 75 and thus cause the cage to be lowered at a relatively slow rate counter to the leaf springs 78—78.

As the cage moves downwardly, the plungers 74 are held by magnetic flux in the position shown in FIGURE 12. As shown, the perforated strip 23 contains two perporations indicated at A' and B' hence, as the cage descends, plunger A passes through the aperture A' and moves into contact with its stationary contact 85. This completes an electrical circuit from line 87 to one of the branch lines 95 which lead to the electrical device of the "1" calculator key. Upon being energized, the device depresses the "1" key momentarily, then releases it, thus entering the digit 1 into the accumulator. The action is similar to the manual operation of the keys in which the key is rapidly depressed and released with the finger.

Continued downward motion of the cage causes the B plunger to pass through the aperture B' and into electrical contact 85, thus energizing another branch line 95. This completes a circuit through the electrical device of the "2" key in the same column, thus depressing the "2" key momentarily to enter 2 into the accumulator, which is added to the 1 previously entered and stored therein. It will be noted at this point, that the A plunger remains stationary with its stationary contact 85 while the cage continues to move along the plunger in the downward direction.

In the present example, the punched strip 23 is punched only for the A and B plungers; hence, as the C and D plungers descend, they contact the sheet and are insulated from their contacts. Accordingly, no further signals are sent to the electrical devices in this particular column of keys. When the reader lever 24 engages its stop 94, the eccentrics 91—91 will have been rotated to the position of FIGURE 13. This completes the reading cycle, and the lever 24 and eccentrics 91 are then rotated back to the original position shown in FIGURE 12. For this purpose, there is provided the spring means (not shown) for rotating the shaft and eccentrics back to the starting position upon release of the lever.

Referring to FIGURE 13, the upper ends of the plungers 74 reside in an angular plane corresponding to the plane 84 of FIGURE 12 at the end of the reading cycle. As the cage is shifted back to its elevated position, the plungers are held in this position by magnetic flux until their upper ends are brought into contact with the lower surface of bar 81 so as to level he upper ends and reset them to the position in FIGURE 12 for the next reading cycle.

It will be understood that the structure disclosed in FIGURES 11–14 is duplicated for each column of the keys of the calculator. Thus, there is provided on shaft 92 duplicate pairs of eccentrics 91, one pair for each reader column. Actuation of the reader lever 24 thus actuates all of the readers at the same time.

For the purpose of obtaining precise registry of the punched strip 23 with the reading plungers 74, each strip 23 is severed at the end of the reading cycle, thus providing a new locating edge 88 engaging stop 90 for each reading cycle. For this purpose, the reading cage 75 includes a shearing knife 96 (FIGURES 12 and 13) having a cutting edge 97 which normally resides above the surface of the record sheet. The botton panel 67 of housing 30 is provided with a slot 98 to accommodate the cutting edge 97 when the cage descends as in FIGURE 13. As indicated in FIGURE 10, the knife shears the punched strip 23 along the cutting line 100 at the end of the reading cycle. The severed strips are discharged from a slot 101 (FIGURE 3) formed along the rear wall of housing 30. Slot 101 also provides clearance for the extended printing section 17 of the bank statement as the strips 23 successively are sheared from the upper edge of the punching section 16.

According to the present disclosure, the shearing of strip 23 is also utilized in locating the printing section 17 in alignment with the printing sectors when printing the amount withdrawn or deposited during the first operation. For this purpose, the apparatus is provided with a shiftable stop 102 as indicated diagrammatically in FIGURES 1, 5 and 10. The stop 102 preferably is yieldable in order that the sheet may be passed over it into engagement with the fixed stop 90 during the second or reading operation. Thus, as detailed in FIGURE 5, the yieldable stop 102 may be in the form of a finger pivotally mounted as at 103 and biased in arresting position by a spring 104. In the stopping position, the stop 102 engages the top edge 88 during the first operation when the amount withdrawn or deposited is to be printed in section 17 of the bank statement. The stop 102 engaging the edge 88 aligns the printing section 17 precisely with the printing sectors 6 and aligns the punching section 16 with the punch plungers 47. The punches 47 are related to the yieldable stop 102 in the same manner as the reading plungers 74 are related to the fixed stop 90.

In order to align the sheet with the amount to be printed and punched in the balance line, the left edge of the sheet may be provided with a series of notches 105 (FIGURE 10) which are engaged with an indexing pin 106 for the balance printing operation. This arrangement is utilized because the punched strip 23 previously is severed during the reading operation; accordingly, if the newly severed edge 100 is brought into contact with the stop 102, then the balance line would be spaced out of alignment with the previously printed withdrawal or deposit amounts. The spacing of the notches 105 is such that when the notch adjacent the printed withdrawal or deposit amount is engaged with the indexing pin, the sheet is properly aligned with the printing sectors of the balance section, thus printing the new balance in alignment with the withdrawal or deposit figures as shown in FIGURE 10. Pin 106 preferably is yieldably mounted as described with reference to stop finger 102 to allow the sheet to be shifted laterally in locating the column, as explained below.

In order to locate the columns in the amounts printed, the selector switches 10 are actuated, as noted earlier, for the withdrawal or deposit amount during the first operation and for the balance amount during the third operation by shifting the carriage laterally. This structure (not shown) does not form an essential part of the present invention, the details being fully disclosed in the patent. It will be understood that the structure is modified only in detail to locate the columns in alignment with the type sectors. The sheet feeding mechanism, which rotates the carriage rollers 27 to feed the sheet to and from the printing sectors, is not utilized when the punching and reading apparatus is controlled manually; the carriage rollers are utilized only in shifting the sheet transversely for column selection.

Described generally, the sheet feeding roller mechanism 27, for shifting the sheet laterally for column selection, comprises an upper roller 107 and a lower roller 108 (FIGURE 3). When the sheet is fed into the apparatus, the lower roller 108 remains in its lowered position, and during the printing cycle, the lower roller is elevated by a solenoid 110 (FIGURE 3) which is interconnected as at 111 with the lower roller. When solenoid 110 shifts roller 108 upwardly, the sheet 15 is engaged between the two rollers. Thereafter, the control mechanism of the printing attachment shifts the rollers laterally in accordance with the position signalled by the column selector switches 10. As the sheet is shifted, the index pin 106 yields to permit it to pass; the pin snaps back to its indexing position when the sheet is shifted back to its starting position. When the sheet reaches its lateral column position, the type hammers 28 are energized to print the amount exposed by the printing sectors. After printing, the rollers are shifted laterally back to the starting position carrying with them the printed sheet. This operation takes place during the first operation when the deposit or withdrawal sum is printed and also during the third operation when the total balance sum is printed. The sheet is in its starting position against the lateral guide 46 when the hole pattern is read during the second operation and when the new hole pattern is punched during the third operation. In other words, the control system is arranged to shift the sheet back to the starting position after printing the balance but before the new balance is punched.

It will be noted that if the printing, punching, and reading operations are to be executed automatically, then the sheet feeding apparatus of the patent may be utilized with suitable modifications to provide the required motions. In automatic feeding, the indexing stop 106 and notches 105 preferably are utilized to position the sheet initially at the start of the cycle. In this case, the rollers 107 and 108 move into engagement with the sheet at the start of each printing cycle, as in the patent, rotate to shift the sheet inwardly and outwardly to align the sheet with the printing and punching sectors and with the reader during the cycle.

For automatic operation, the control system of the patent may be modified slightly so as to shift the sheet longitudinally and transversely, by operation of the carriage, through the cycle sequence in an automatic manner. Thus, the sheet may be placed manually against guide 46 at the start of the cycle and thereafter shifted longitudinally and transversely by the carriage during the printing, reading, and punching operations.

*Electrical key actuating devices*

As noted earlier, the keys "1," "2," "4" and "7" are equipped with electrical actuating devices for operation in response to the reader signals. As shown in FIGURE 16, the key 112, which represents any one of the power operated keys, includes a stem 119 which is provided with an elongated slot 113 through which passes the plunger 114 of a solenoid coil 115. The outer end of the plunger 114 includes a key-actuating cam 116, which acts upon the lower edge of slot 113. The plunger normally is shifted to the extended position shown in full lines by a compression spring 117 engaging the rearward end of the plunger. When coil 115 is energized, hte plunger is withdrawn to the position shown in broken lines, counter to spring 117.

During the retracting motion of the plunger, its upper surface is engaged against the lower edge of the flap element 118 which is pivoted as at 120 to a pin mounted within the casing of the calculator. The flap element lies in contact with the stem 119 of the key during the retracting motion of the plunger. Since the flap 118 restrains the plunger 114 against upward movement, its cam 116 acts against the lower edge of slot 113 and depresses the key as indicated in broken lines, thus entering into the accumulator the amount represented by the key.

When the solenoid 115 is deenergized, the plunger 114 is shifted by spring 117 outwardly to its full line position. As the plunger 114 is shifted outwardly by spring 117, the flap element 118 swings outwardly, as shown in broken lines, allowing plunger 114 to shift upwardly as its cam 116 rides over the lower edge of slot 113. Therefore, the key is not depressed during the return motion of the plunger when the solenoid is deenergized. The flap element 118 includes an upper projection 121 connected to a tension spring 122 which urges the flap element to its normal downswung position. After cam 116 passes beyond slot 113, the plunger 114 drops to the position shown in full lines and the spring 122 shifts the flap element downwardly to its normal position, ready for the next cycle. Since the flap element is pivoted independently of the stem 119, the key is free to be depressed manually without interference. It will be noted that this arrangement causes the key to be depressed once upon energization of solenoid coil 115. The slot 113 of stem 119 provides clearance for depressing the key manually; hence, the electrical device does not interfere with manual operation of the key.

The modified electrical device of FIGURE 17 provides the same operation as above described. In this case, the solenoid coil 115 includes a plunger 123 which normally is urged to the right hand position shown in full lines by a tension spring 124. The plunger is stopped in this position by a pin 125. A bell crank lever 125 is pivoted as at 128 to the plunger 123, and a latch 127 is pivoted as at 129 to the bell crank lever. The latch normally is held in the position shown in full lines by a tension spring 130 connecting the latch to bell crank lever 126. The upper end of the latch 127 includes a hook 131 normally engaging the cross piece 132 of the stem of the modified key 134.

Intermediate the length of latch 127, there is provided a projecting cam or spur 135. When the solenoid is energized, plunger 123 shifts to the left as indicated by the arrow, causing the bell crank 126 to swing about its pivot point 133. This shifts the latch 127 downwardly, thus depressing the key as indicated by the broken lines. When the key is fully depressed, the inclined surface of cam 135 acts against the fixed pin 136, causing the latch to swing about its pivot point 129 until its hook 131 disengages the cross piece 132 of the key. At this point, the key snaps back to its normal position, the amount having been entered into the accumulator. The latch remains in the position shown in broken lines until the solenoid is deenergized, at which point, the springs 124 and 130 shift the parts back to the position shown in full lines. It will be noted that the latch 127 does not interfere in any way with the manual operation of key 134.

The circuit for energizing the key actuating solenoids 115 is shown diagrammatically in FIGURE 15. The circuit is powered by the power lines 87 and 137 which are energized by the control system of the printing attachment during the reading cycle. As noted earlier, reader switch 25 in line 87 is closed manually during the reading cycle. The circuit from the reader plungers 74 to the contacts 85 is completed by way of the branch lines 95 previously noted. These lines as shown in FIGURES 15–17, are in connection with one side of the solenoid windings 115. The circuit through the windings is completed by way of branch lines 138 which lead to the power line 137. The illustrated circuit provides actuation of the "1," "2," "4" and "7" keys of one column, a similar circuit being provided for each column of keys.

The eccentrics 91—91 shift all of the reader cages 75 downwardly at a relatively slow rate so that there is created a time interval as the contacts sequentially are closed and energized. In the conventional calculating machine, under manual operation, the amounts are fed into the accumulator as the key is depressed and released in a fraction of a second. In the ppresent actuating devices, the solenoids depress and release the keys with the same or greater speed, such that the amount is fed into the accumulator and the key is released before the next reader plunger 74 makes contact. Accordingly, the reader and electrical devices are accommodated to conventional calculating machines and require no major alteration in the calculator other than equipping the keys with the electrical devices.

It will be understood that the foregoing disclosure is intended to illustrate the principles of the invention as applied to one practical use. It will be evident that the punching apparatus and reading apparatus may be utilized in solving a great many problems which involve recording a sum or quantity on a punched card for use in conjunction with calculating machines wherein the punched hole pattern is scanned or read to provide automatic operation of the machine.

Having described my invention, I claim:

1. A reading apparatus for calculating machine having a plurality of manually operated keys and result indicators which indicate the result of a calculation in response to manual actuation of said keys, said apparatus reading a coded hole pattern of a record sheet and entering the result thereof into the calculating machine, said reading apparatus comprising, a reader cage, a group of reader elements shiftably mounted within said cage, a group of reader contacts mounted adjacent the reader elements and in registry therewith, said reader elements normally spaced from said contacts for insertion therebetween of the record sheet with the hole pattern thereof in registry with the said reader elements and related contacts, the individual contacts and reader elements being spaced diversely from one another, electrical key-actuating means connected to said reading apparatus, said key-actuating means in direct mechanical driving connection with selected keys of the calculating machine for actuating the same, and means for shifting said reader elements and contacts toward one another with the code hole pattern of the record sheet in registry therewith, the said hole pattern providing sequential energization of the key-actuating means through the relative diverse spacing of the individual reader elements and contacts, whereby the selected keys are activated in sequence to enter into the calculating machine the amount which is represented by said hole pattern.

2. A reading apparatus for a calculating machine having a plurality of manually operated keys and result indicators which indicate the result of a calculation in response to manual actuation of said keys, said apparatus reading a coded hole pattern of a record sheet and entering the result into the calculating machine, said reading apparatus comprising, a reader cage, a group of reader plungers mounted for axial motion within said cage, a group of contacts residing in a common plane adjacent the outer ends of the reader plungers and in registry therewith, the outer ends of said reader plungers normally spaced outwardly from said contacts, said outer ends being diversely spaced in relation to the plane of said contacts for insertion therebetween of a record sheet with the hole pattern thereof in registry with the outer ends of said plungers and related contacts, electrical key-actuating means connected to said contacts and plungers, said key-actuating means in direct driving connection with selected keys of the calculating machine for actuating the same, said cage shiftably confining said reader plungers in said normal position for axial motion with respect to the cage, and means for shifting said cage and contacts relatively toward one another with the code hole pattern of the record sheet in registry with the outer ends of said plungers and related contacts, whereby the said diversely spaced outer ends sequentially pass through the holes of said pattern during said motion toward the contacts, said apparatus sequentially energizing the key-actuating means and thereby actuating the keys in sequence to enter into the calculating machine the amount which is represented by said hole pattern.

3. A reading apparatus for calculating machine having a plurality of manually operated keys and result indicators which indicate the result of a calculation in response to manual actuation of said keys, said apparatus scanning a coded hole pattern of a record sheet and entering the result into the calculating machine, said reading apparatus comprising a reader cage, a group of reader plungers mounted for axial motion within said cage, a group of stationary contacts residing in a common plane adjacent the outer ends of the reader plungers in registry therewith, the outer ends of said reader plungers normally spaced outwardly from said contacts for insertion therebetween of a record sheet with the hole pattern thereof in registry with the respective outer ends of said plungers being diversely spaced from said contacts, respective electrical key-actuating devices connected to said stationary contacts, said devices in direct driving connection with selected keys of the calculating machine for actuating the same, said cage shiftably confining said reader plungers in said normal position by magnetic attraction for axial motion with respect to the cage, and means for shifting said cage and reader plungers toward said stationary contacts with the code hole pattern of the record sheet in registry with the outer ends of said plungers and related contacts, whereby the said outer ends sequentially pass through the holes of said pattern during said motion toward the contacts, said plungers engaging said contacts and being sequentially stopped upon engaging the same during the shifting motion of the cage, whereby the individual plungers sequentially energize the contacts and selected key-actuating devices in sequence to enter into the calculating machine the amount which is represented by said hole pattern.

4. A reading apparatus for a calculating machine having manually operated keys, the calculating machine having result indicators which indicate the result of a calculation, said result indicators being advanced in response to actuation of said keys, said reading apparatus scanning a coded hole pattern of a record sheet and reading and entering the same into the calculating machine, said reading apparatus comprising, a reader cage, a group of plungers slidably mounted for axial motion in said cage, said reader cage adapted to hold said slidable plungers normally in a stationary position by magnetic attraction, the said group of plungers having outer ends which are positioned to register with the hole pattern of the record sheet, a group of stationary contacts residing in a common plane and located in registry with said plungers, the outer ends of said plungers normally residing in a plane which is angularly related to the common plane of the stationary contacts and being spaced outwardly therefrom for insertion therebetween of the record sheet with said hole pattern in registry with said plungers and contacts, a plurality of electrical key-actuating devices corresponding in number to said stationary contacts, said key-actuating devices being connected to a selected group of keys for actuating said keys, and means connected to said reader cage for shifting the cage and plungers thereof toward said stationary contacts, whereby the outer ends of said plungers through the angularly related plane thereof adapted to sequentially energize said key-actuating devices to actuate the selected keys, said keys additively feeding into the calculating machine the amount represented by said hole pattern.

5. A reading apparatus for a calculating machine having manually operated keys arranged in columns, the calculating machine having result indicators which indicate the result of a calculation, said result indicators being advanced in response to actuation of said keys in sequence, said reading apparatus scanning a coded hole pattern of a record sheet and reading and entering into the calculating machine the result represented by said hole pattern, said reading apparatus comprising, a reader cage, a group of plungers slidably mounted for axial motion in said cage, the said group of plungers having outer ends which are positioned to register with the hole patterns of the record sheet, a group of stationary contacts residing in a common plane and located in registry with said plungers, the outer ends of said plungers normally residing in a plane which is angularly related to the common plane of the stationary contacts and being spaced outwardly therefrom for insertion therebetween of the record sheet with said hole pattern in registry with said plungers and contacts, the number of plungers and related stationary contacts being less than half the number of keys in said columns, a plurality of electrical key-actuating devices corresponding in number to said stationary contacts, said key-actuating devices being connected to a selected group of keys of at least one of said columns for direct actuation of said keys, said selected keys being capable of entering consecutive amounts into the calculating machine and upon sequential actuation thereof, and means connected to said reader cage for shifting the cage and plungers thereof toward said stationary contacts, whereby the outer ends of said plungers sequentially pass through the holes of said pattern into engagement with said stationary contacts, said slidable plungers being sequentially stopped upon engaging said contacts during the shifting motion of the cage and thereby sequentially energizing said key-actuating devices to actuate the selected keys in sequence, said keys additively feeding into the calculating machine the amount represented by said hole pattern.

6. A reading apparatus for a calculating machine having a plurality of manually operated digit keys and result indicators which indicate the result of a calculation in response to actuation of keys in sequence, said apparatus scanning the hole pattern of a record sheet and entering the result thereof into the calculating machine, said reader apparatus comprising a reader cage, a group of reader plungers slidably mounted in said cage, a group of stationary contacts residing in a common plane adjacent the outer ends of said reader plungers, a stationary backing surface residing adjacent the inner ends of said reader plungers, said reader plungers respectively having diverse lengths, said cage normally residing adjacent said backing surface with the inner ends of the plungers thereof in contact with said backing plate, whereby the outer ends of the respective plungers reside at diverse spacing from the plane of said stationary contacts for the insertion therebetween of a record sheet with pattern of holes thereof in registry with the outer ends of said plungers and related contacts, said reader cage adapted to hold said slidable plungers normally in a stationary position by magnetic attraction, respective electrical key-actuating devices electrically connected to said stationary contacts, said devices in driving connection with selected keys of the calculating machine and adapted to depress and release said keys individually upon being energized and means for shifting said cage and the plungers thereof toward said stationary contacts, whereby the outer ends of said plungers sequentially engage said stationary contacts, said slidable plungers being sequentially stopped upon engaging said contacts and thereby sequentially energizing said key-actuating devices and actuating said selected keys in sequence to enter into the calculating machine the amount which is represented by said hole pattern.

7. A reading apparatus for a calculating machine having a plurality of manually operated digit keys and result indicators which indicate the result of a calculation in response to actuation of keys in sequence, said apparatus scanning the hole pattern of a record sheet and entering the result thereof into the calculating machine, said reading apparatus comprising, a reader cage, a group of reader plungers slidably mounted in said cage, a group of stationary contacts residing in a common plane adjacent the outer ends of said reader plungers, a stationary backing surface residing adjacent the inner ends of said reader plungers, said reader plungers having successively increasing lengths, said cage normally residing adjacent the cage and said backing surface with the inner ends of the plungers thereof in contact with said backing surface, means associated with the reader cage adapted to restrain the sliding motion of said reader plungers relative to said cage, whereby the outer ends of said reader plungers reside in an inclined plane and in spaced relationship to the plane of said stationary contacts for the insertion therebetween a record sheet with the pattern of holes in registry thereof with the outer ends of said plungers and related contacts, respective key-actuating devices electrically connected to said stationary contacts, said devices in driving connection with selected keys of the calculating machine, and means for shifting said cage and the plungers thereof toward said stationary contacts, whereby the outer ends of said plungers sequentially engage said stationary contacts, said slidable plungers being sequentially stopped upon engaging said contacts and thereby sequentially energizing said key-actuating devices and actuating said selected keys in sequence to enter into the calculating machine the amount which is represented by said hole pattern.

8. A reading apparatus for a calculating machine having manually operated keys and having result indicators which indicate the result of a calculation, said reading apparatus scanning the hole pattern of a record sheet and entering into the calculating machine the amount represented by said hole pattern, said hole pattern being located adjacent an edge of said record sheet, said reading apparatus comprising, a reader cage, a group of reader elements shiftably mounted in said cage, a group of stationary contacts located in registry with respective reader elements, said reader elements and contacts normally spaced apart from one another for insertion therebetween of the edgewise portion of the record sheet which bears said hole pattern with the hole pattern in registry with the reader elements and stationary contacts, said reader elements and stationary contacts being disposed at diverse spacing when normally spaced apart from one another, electrical key-actuating means operatively connected to selected keys of the calculating machine, said contacts being electrically connected with the key-actuating means for energizing the same, means for shifting said cage and reader elements toward said stationary contacts, whereby the reader elements pass through the holes of said pattern and engage the stationary contacts in sequence according to the diverse spacing of said contacts and reader elements, said contacts energizing the key-actuating means upon being contacted by said plungers and actuating the selected keys, thereby entering into the calculating machine the amount represented by said hole pattern, and sheet-severing means connected to said cage, said severing means shearing from the record sheet the portion thereof bearing the hole pattern upon motion of the reader elements into contact with the stationary contacts.

9. A reading apparatus for a calculating machine having manually operated keys and having result indicators which indicate the result of a calculation, said reading apparatus scanning the hole pattern of a record sheet and entering into the calculating machine the amount represented by said hole pattern, said hole pattern being located adjacent an edge of said record sheet, said reading apparatus comprising, a reader cage, a group of reader plungers, said cage having bores, said plungers being shiftably mounted in said bores for axial motion relative to said cage, a group of stationary contacts residing in a common plane, said contacts being located in registry with respective plungers, the outer ends of said plungers being disposed in an inclined plane relative to the common plane of the stationary contacts and normally spaced outwardly therefrom fro insertion therebetween of the edgewise portion of the record sheet which bears said hole pattern, a stop means located adjacent said group of plungers and stationary contacts, said stop means engaging the edge of said record sheet and locating said hole pattern in registry with the outer ends of said plungers and related contacts, electrical key-actuating means for actuating selected keys of the calculating machine, said contacts being electrically connected with the key-actuating means for energizing the same, means for shifting said cage and plungers toward said stationary contacts, whereby the outer ends of said plungers sequentially pass through the holes of said pattern and engage the stationary contacts, said shiftable plungers being sequentially stopped upon engaging the contacts and thereby sequentially energizing the key-actuating means upon being contacted by said plungers and thereby actuating the selected keys in sequence and entering into the calculating machine the amount represented by the said hole pattern, and sheet severing means connected to said cage, said sheet severing means located relative to the hole pattern on the side opposite said stop means, said severing means shearing from the record sheet the portion thereof bearing the hole pattern upon motion of the plungers into engagement with the stationary contacts, whereby said portion of the hole pattern is sheared after the pattern has been scanned by said plungers, the severing means thereby provding a successive edge for engagement with the stop means for the scanning of a subsequent hole pattern.

10. A reading apparatus for a calculating machine having manually operated keys and having result indicators which indicate the result of a calculation, said reading apparatus scanning the hole pattern of a record sheet and entering into the calculating machine the amount represented by said hole pattern, said hole pattern being located adjacent an edge of said record sheet, said reading apparatus comprising, a reader cage, a group of reader plungers, said cage having bores, said plungers being shiftably mounted in said bores for axial motion relative to said cage, magnetic means partially restraining said plungers against axial motion relative to said bores, a group of stationary contacts residing in a common plane, said contacts being located in registry with respective plungers, the outer ends of said plungers being relatively disposed in an inclined plane relative to the common plane of the stationary contacts and normally spaced outwardly therefrom for insertion therebetween of the edgewise portion of the record sheet, stop means located adjacent said group of plungers and stationary contacts, said stop means engaging the edge of said record sheet and locating said hole pattern in registry with the outer ends of said plungers and related contacts, electrical key-actuating means for actuating selected keys of the calculating machine, said contacts being electrically connected with the key-actuating means for energizing the same, means for shifting said cage and plungers toward said stationary contacts, whereby the outer ends of said plungers sequentially pass through the holes of said pattern and engage the stationary contacts, said shiftable plungers being sequentially stopped upon engaging said contacts, said contacts sequentially energizing the key-actuating means upon being contacted by said plungers and thereby actuating the selected keys in sequence and entering into the calculating machine the amount represented by said hole pattern, and sheet severing means connected to said cage, said sheet severing means located relative to the hole patterns on the side opposite said stop means, said severing means shearing from the record sheet the portion thereof bearing the hole pattern during motion of the reader cage toward the stationary contacts, whereby said portion of the record sheet is sheared after the pattern has been scanned by said plungers, the severing means thereby providing a succcessive edge for engagement with the stop means for the scanning of a subsequent hole pattern.

References Cited in the file of this patent

UNITED STATES PATENTS

| | | |
|---|---|---|
| 748,766 | Marshall | Jan. 5, 1904 |
| 847,672 | Little | Mar. 19, 1907 |
| 1,292,944 | Wright | Jan. 28, 1919 |
| 1,489,534 | Lebeis | Apr. 8, 1924 |
| 1,626,871 | Peirce | May 3, 1927 |
| 1,970,714 | Stickney | Aug. 21, 1934 |
| 2,400,949 | Pitman | May 28, 1946 |
| 2,405,268 | Pitman | Aug. 6, 1946 |
| 2,459,468 | Sundstrand | Jan. 18, 1949 |
| 2,487,357 | Mills et al. | Nov. 8, 1949 |
| 2,536,837 | Carey et al. | Jan. 2, 1951 |
| 2,583,666 | Pitman | Jan. 29, 1952 |
| 2,637,493 | Wittenmyer | May 5, 1953 |
| 2,850,238 | Hoffman | Sept. 2, 1958 |